United States Patent Office 3,323,622
Patented June 6, 1967

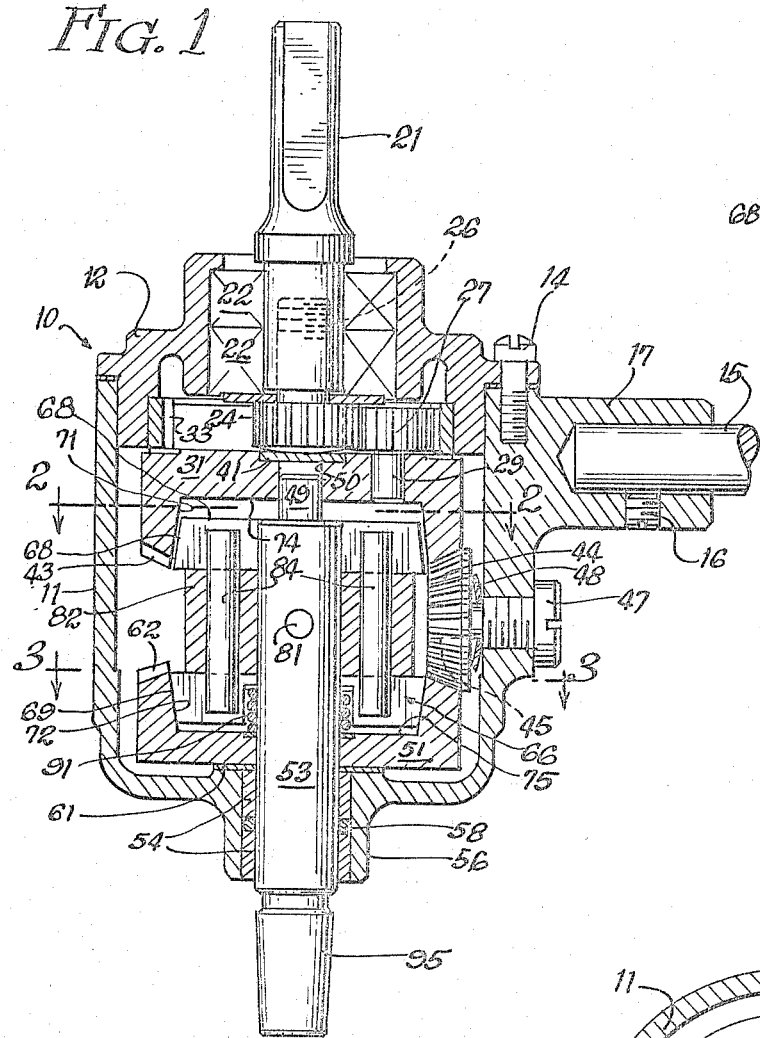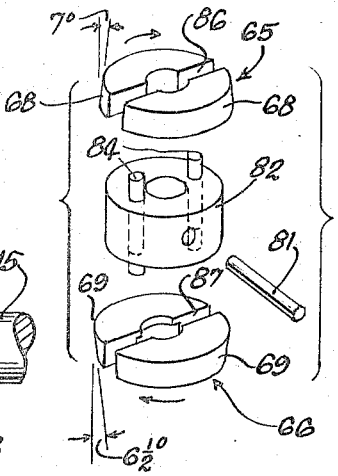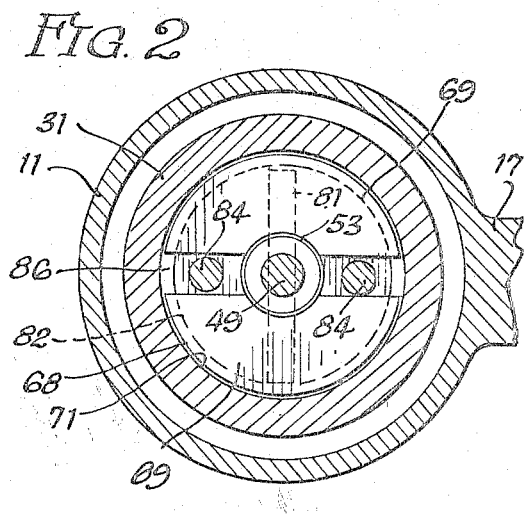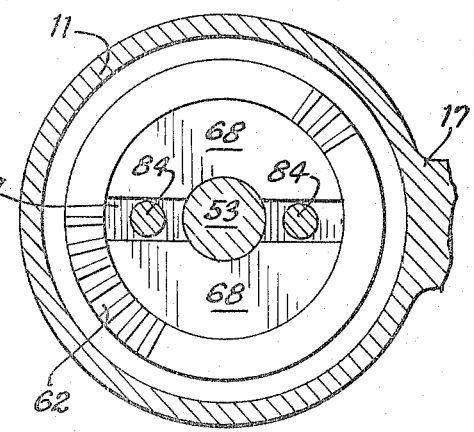

3,323,622
CONE CLUTCHES
Albin G. Troka, Des Plaines, Ill., assignor to Supreme Products Corporation, Chicago, Ill.
Filed Mar. 31, 1965, Ser. No. 444,152
9 Claims. (Cl. 192—51)

This invention relates to cone clutches. More specifically, it has reference to a bi-directional cone clutch wherein reversible rotation of the output is obtained by engaging or disengaging one or the other of a pair of clutches having contra-rotating inputs.

The principal object of the invention lies in an improved version of a pair of clutches characterized as aforesaid, which provides instantaneous coupling and decoupling of the output shaft, without "sticking" such as would be a prime consideration in a device for driving threading taps or dies.

For those applications not warranting the somewhat more expensive and complicated threading devices which are equipped for automatic reversal, there are available attachments to be used with a drill press. In these latter, there is an input shaft arranged to be driven by the spindle or chuck of the drill press and an output shaft mounting the tap or die. Between the input and output shafts, there is a reversing mechanism including suitable speed-reducing means, e.g. planetary gearing, and clutch means so constructed and arranged that downward feeding of the drill press spindle will result in clockwise rotation of the output shaft, and vice versa. The clutch means is arranged so that downward feed engages one of a pair of clutches and reversal of such feed engages the other thereof. Obviously the reversing mechanism may be converted for left-hand threading by introducing gearing to obtain clockwise rotation of the drill press spindle for counter-clockwise rotation of the output shaft for tapping or withdrawal of the tap, respectively.

An attachment of the foregoing character is disclosed, for example, in U.S. Patent No. 3,075,398, granted on Jan. 29, 1963, to Howard A. Bristol. In that patent, reversal of the output shaft is obtained by reversal of the translational movement of the drill press spindle which disengages one of a pair of cone clutches and engages the other of the pair. The present invention relates to improvements in the general organization of the clutches disclosed therein to facilitate disengagement, it having been found that, upon reversal of the linear movement of the drill press spindle, "sticking" may occur. In this regard it will be understood that a tapped hole, for example, is frequently of some predetermined depth and, unless reversal of the output spindle can be instantaneous, the tap may be broken, since the bored hole may not leave too much margin for overtravel of the tap. In the case where a tap is "bottomed" the need for rapid reversal is even more imperative.

Other objects and advantages of the invention will become apparent from the ensuing description which, taken with the accompanying drawing, discloses a preferred form in which the principles of the invention may be embodied in practice.

In the drawing:

FIG. 1 is a longitudinal cross-section through a threading attachment embodying the improved clutch means of the invention;

FIG. 2 is a cross-section taken on the line 2—2 of FIG. 1;

FIG. 3 is a cross-section taken on the line 3—3 of FIG. 1; and

FIG. 4 is an exploded view showing certain parts of the output side of the clutches.

Regarded broadly, the invention comprises means to provide contra-rotation of the inputs, which include members having a frusto-conical cavity, of a pair of cone clutches, for example, by unidirectional torque applied to one input and reversal of the torque applied to the other input by suitable gearing. The output side of each clutch includes a shiftable assembly comprising a pair of symmetrical parts which, regarded together, have an exterior active surface of frusto-conical configuration. These parts are separated in a diametrical zone and, acting as a pair, drive the output shaft through pins extending into such zone. These pins are secured to the output shaft. The output shaft is arranged to shift axially whereby one or the other shiftable assembly is caused to frictionally engage its respective driving cavity.

In another aspect the invention comprehends an apical angle for the frusto-conical surface which is less for the output shaft "reverse" clutch than for the output shaft "forward" clutch. By "forward" I refer to that direction of rotation of the output shaft which is clockwise looking downwardly on the drill press spindle, and by "reverse" I refer to the opposite direction of rotation. In the case of a tap or die cutting a right-hand thread the "forward" clutch is engaged and for withdrawal of the tap or die from the work piece the "reverse" clutch is engaged. However, the foregoing glossary is a relative one since, for left-handed threading, the terms would have the opposite significance.

Adverting to the drawing there is shown, by way of example, an attachment for a drill press for forming threads in or on a work piece, using either a tap or a die. Where, in this specification reference is made to a tap, the same is to be understood as referring also to a die or any other tool which requires reversal of rotation.

The attachment comprises a housing 10, including a body 11 and a cap 12, secured together by screws 14. The housing is rendered non-rotatable by means of a rod 15 secured by a screw 16 in a hollow boss 17, this rod having, at its distal end, a Y-shaped yoke abutting the main post of the drill press. The foregoing arrangement is common in threading attachments of the class here involved and needs no further elucidation.

The input shaft 21 is of a type for securement directly to the spindle of the drill press or to a Jacobs-type chuck, and is rotatably supported on the cap 12 by means of antifriction bearings 22—22. A sun gear 24 has a stub shaft 26 threaded into the shaft 21, and drives a plurality, e.g. three, planet gears 27 freely rotatable on individual pivots 29 secured in the driving member 31 of the "forward" clutch. The planet gears 27 are in mesh with a ring gear 33 fixed in the cap 12. Thus, "forward" rotation of the spindle 21 provides "forward" rotation of the driving member 31.

Inasmuch as the sun gear 24 and the member 31 could abut thrust bearing means are provided. In the example such means consists in providing the gear with a crowned, lower face and the member 31 with a hardened disc 41 retained in a conforming recess.

The member 31 is provided with bevel gear teeth 43 in mesh with a plurality of bevel idler pinions 44, in this case three in number, equally spaced circumferentially and only one of which is illustrated. These idler pinions are carried on pivots 45 at the end of screws 47 threaded into the body 11. Bowed, resilient washers 48 are interposed between the body 11 and pinions 45 to maintain the latter in mesh.

A lower clutch driving member 51 is arranged to rotate freely upon an output shaft 53, and this latter is rotatable in bushings 54—54 pressed into a boss 56 at the lower part of the body 11. An O-ring seal 58 is interposed between the two bushings. A thrust washer 61 is positioned between the member 51 and the body 11. The upper end 49 of the shaft 53 is guided in a bore 50 in the member 31, with sufficient clearance below the disc 41 to accommodate axial shifting of the shaft.

Member 51 has bevel teeth 62 with which the bevel pinions 44 are in mesh. Thus the members 31 and 51 are in continuous contra-rotating relation as driven by the input shaft 21.

The assembly constituting the driven part of the two clutches is depicted particularly in FIG. 4, and comprises two driven members 65 and 66, each consisting of a pair of substantially semi-frusto-conical elements having a joint peripheral face 68 and 69 which is a frusto-conical surface. When the respective clutches are engaged these surfaces abut complementary surfaces 71 and 72 of the frusto-conical cavities 74 and 75 in the members 31 and 51 respectively.

Secured, as by a pin 81, to the shaft 53 is a cylindrical member 82, into which is press-fitted a pair of diametrically-opposite pins 84—84 which protrude into the respective gaps 86 and 87.

The assembly of FIG. 4 is normally biased toward an upper position by means of a compression spring 91, to assist in disengagement of the lower clutch, since this latter would otherwise tend to remain engaged under the influence of gravity notwithstanding relaxation of feeding pressure by the operator.

The pins 84—84 are of a diameter slightly less than the width of the gaps 86 and 87, measured when the repective clutch is engaged. In a commercial embodiment such diameter is 0.250″ and the gaps are each 0.270″. Such clearance avoids binding while providing proper coupling of the clutches and the rapid decoupling thereof, as will be detailed subsequently. It will be apparent that the fit between the shaft 53 and the respective pairs of elements 68—68 and 69—69 is of a sliding character.

The threading tool, e.g., a tap, is received in a suitable collet (not shown) which is attached to the lower end 95 of the output shaft 53, such end desirably having a standard Morse taper for ease in attaching and detaching the collet.

It will be convenient to refer herein sometimes to the clutch member 31 and its associated driven parts as the "upper clutch" and the clutch member 51 and its associated driven parts as the "lower clutch."

Assuming that the lower clutch has been engaged, as shown in FIG. 1, and that the operator has just completed tapping a hole in the work piece, he will then actuate the drill press spindle upwardly. The moment for such actuation may be evidenced by "feel" or by a suitable depth gauge. At this instant upward movement of the housing 10 will disengage the upper clutch and engage the lower clutch, so that "reverse" rotation will be imparted to the output shaft 53 and the tap rotated reversely while the operator continues its retraction. During such upward movement of the housing 11 the member 51 is moved into coupled relation with the segments 69 which, therefore, through the pins 84, will rotate the shaft 53 in "reverse." When the upper limit of the travel required to withdraw the tap has been reached, the operator's release of the drill press spindle will relieve the engaging force on the lower clutch and the spring 91 will be effective to de-couple the clutch. By reason of the clearance between the pins 84—84 and the space 86 or 87, no wedging or jamming of the clutch can occur. Stated otherwise, the clutch disengages without "sticking."

After the succeeding work piece is in position the operator will actuate the drill press spindle downwardly. Accordingly, the upper clutch will be engaged. During this phase the segments 68—68 will abut the member 31 and the segments 69—69 will "float." Following completion of the tapping operation another reversal of the drill press spindle will disengage the upper clutch, such disengagement being effected by the tap restraining the output shaft 53 which, through the pin 81, will relax the clutch-engaging force, whereafter the segments 68—68 will "float."

In the absence of the improvement constituting the inventive concept (FIG. 4), it was found that sticking of the male and female frusto-conical clutch surfaces presented a serious problem, such as when the male clutch part was a complete frusto-conical segment. Such problem is avoided in the present organization as will now be explained.

Upon application of clutch-engaging force for "forward" or "reverse" driving the member 82 abuts the pertinent segments, either 68—68 or 69—69 to bring them into such degree of wedging engagement with either the surface 71 or 72, as the case may be. Transmission of driving torque is from the input shaft 21, through the planetary transmission alone or through this transmission and the reversing pinions 44, through the elements 65 and 66, pins 84—84, and member 82, pin 81 to the output shaft 53. However, upon interruption of power to either of the driving clutch parts 31 or 51, as the case may be, the segments 68—68 and 69—69 may float since, as mentioned above clearance is intentionally provided between the pins 84—84 and the respective ones of the pairs of segments 65 and 66. Such freedom on the part of the segments to "float" results in immediate de-coupling, i.e., absence of sticking.

Another feature of the invention consists in providing a greater slope to the working faces of the segments 68—68 than to the faces of the segments 69—69. Such slope is referred to as the semi-apical angle of the conical surface to which the aforesaid working faces conform. For example, in FIG. 4, the upper such angle is 7° and the lower one 6½°. It will be understood that the mating faces of the members 31 and 51 will have the same respective slope. Provision of these different angles is based on the fact that, if tool breakage is to be avoided, the most rapid disengagement of the upper clutch must be assured. This important desideratum is achieved by increasing the clutch face angle thereof. However, it is pertinent to note that, for maximum efficiency of transmission through a cone clutch, the face angle be a minimum consistent with the respective coefficients of friction of the engaging surfaces and the axially-applied engaging force. Thus minimum angles are desirable. In the present case a slight sacrifice has been made in the interest of more rapid disengagement.

In attachments incorporating the features of the invention and high speed steel taps satisfactory clutching and declutching is obtained without sticking if the following table of drill press spindle speeds is observed:

| Tap Size | Tool Steel | Mild Steel | Cast Iron | Brass Bronze | Aluminum |
| --- | --- | --- | --- | --- | --- |
| #10-¼″ | 1,500 | 2,000 | 2,000 | 3,000 | 3,500 |
| ¼″-⁷⁄₁₆″ | 1,000 | 1,500 | 1,500 | 2,500 | 3,000 |
| Over⁷⁄₁₆″ | 500 | 1,000 | 1,000 | 1,500 | 2,000 |

The exemplificative attachment provides speed reduction from the drill press spindle to the output shaft of 4:1, and will accept taps from No. 10 to ⅝″.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. A cone clutch comprising an input shaft to be connected to a source of power for rotation thereof, a driving member adapted to be rotated by said shaft, said member having a frusto-conical female face, a driven member comprising a pair of elements, said elements having a joint face conforming to a frusto-conical surface to frictionally engage said female face when the clutch is engaged, said elements being separated by a gap transverse to the axis of rotation, an output shaft, a member secured to said output shaft for rotation therewith, said member having a pair of diametrically-opposite pins parallel to the axis of rotation each including a portion extending into said gap, said output shaft member having a surface adapted to abut said elements to engage the same with said driving member in response to relative axial displacement of said output shaft member and said driving member, the diameter of the gap-entering portion of said pins being less than the width of the gap measured when the clutch is engaged, means to effect selective axial displacement between said output shaft member and driving member to effect engagement and disengagement of the clutch, and a framework including bearings rotatably supporting the several rotatable parts.

2. A bi-directional transmission, comprising an input shaft to be connected to a source of power for rotation thereof, a pair of clutches including respective input members and respective output members, means connecting said input members to said input shaft to rotate said input members in opposite directions, said input members each having a frusto-conical female surface, said output members each comprising a pair of elements having a joint face of frusto-conical configuration adapted, as a pair, to frictionally engage a respective said female surface for driving thereof by the associated input member, said elements being separated by a gap extending transversely of the axis of rotation, an output shaft, a member mounted on said output shaft for rotation therewith, said member having a pair of diametrically opposite pins extending parallel to the axis of rotation of said output shaft, said pins extending into respective ones of the gaps, to transmit torque from the respective ones of said clutches to said output shaft for selective rotation thereof in opposite directions, the diameter of the gap-entering portion of said pins being less than the width of the respective gap measured when the clutch is engaged, said output shaft member being adapted to abut one or the other of said pairs of elements to couple the same to a respective clutch input member, means to effect relative axial replacement between the clutch input members and the output shaft member to effect said coupling selectively, and a housing including bearings rotatably supporting the several rotatable parts.

3. A clutch in accordance with claim 1 wherein said output shaft member and pair of elements are provided with respective confronting faces adapted to abut to engage the respective clutch.

4. A clutch in accordance with claim 3 wherein said pins are normal to said confronting faces.

5. A transmission in accordance with claim 2 wherein said output shaft member and pairs of elements are provided with respective confronting faces adapted to abut to engage the respective clutch.

6. A transmission in accordance with claim 5 wherein the respective axes of the pins are parallel to the axis of rotation.

7. A transmission in accordance with claim 2 adapted for operation with the axis of rotation of the output shaft disposed vertically, further characterized by the provision of bias means interposed between the housing and the lower pair of elements to overcome the force of gravity acting thereon upon disengagement of the lower clutch.

8. In a cone clutch which includes a driving member having a female, a frusto-conical driving face, the improvement which comprises a driven assembly including a pair of elements having a joint frusto-conical face adapted to be abutted with said female face when the clutch is engaged, said elements being separated for independent radial movement by a gap disposed along a diameter referred to the axis of rotation of the clutch, a driven shaft, means providing a loose connection between said pair of elements and the driven shaft when the clutch is engaged, said loose connection including male members secured to said driven shaft and extending into said gap, said driven shaft having means carried thereby for rotation therewith to shift said elements into coupled relation with said driving member, said connection providing transmission of torque from said driving member to said driven shaft.

9. The combination in accordance with claim 8 wherein said male members are a pair of diametrically opposite pins, said pins having a diameter less than the width of said gap, said gap being measured when said elements are engaged with said driving member.

References Cited

UNITED STATES PATENTS

| | | | |
|---|---|---|---|
| 1,559,944 | 11/1925 | Emrick | 192—51 |
| 1,739,399 | 12/1929 | Kavle | 192—51 |
| 1,915,542 | 6/1933 | Lundin et al. | 192—66 |
| 1,988,967 | 1/1935 | Emrick | 192—51 |
| 2,191,628 | 2/1940 | Scott et al. | 192—66 |
| 2,228,622 | 1/1941 | Emrick | 192—51 |
| 2,530,268 | 11/1950 | Schaid | 192—51 |
| 2,747,713 | 5/1956 | Light | 192—107 |
| 2,959,974 | 11/1960 | Emrick | 192—51 |

FRED C. MATTERN, JR., *Primary Examiner.*

DAVID J. WILLIAMOWSKY, *Examiner.*

C. J. HUSAR, *Assistant Examiner.*